US008810886B2

(12) United States Patent
Novotny et al.

(10) Patent No.: US 8,810,886 B2
(45) Date of Patent: Aug. 19, 2014

(54) METHOD FOR REDUCING SPECKLE PATTERN IN DISPLAY IMAGES

(75) Inventors: Vlad Novotny, Los Gatos, CA (US); Gabriel Matus, Santa Clara, CA (US); Michel Combes, San Leandro, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 229 days.

(21) Appl. No.: 13/368,123

(22) Filed: Feb. 7, 2012

(65) Prior Publication Data

US 2012/0134006 A1   May 31, 2012

Related U.S. Application Data

(62) Division of application No. 12/209,665, filed on Sep. 12, 2008, now Pat. No. 8,134,770.

(51) Int. Cl.
*G02F 1/03* (2006.01)
*G02F 1/07* (2006.01)
*G02F 1/33* (2006.01)

(52) U.S. Cl.
USPC .......................................... 359/246; 359/305

(58) Field of Classification Search
USPC .......... 359/242, 290–292, 298, 359, 237–246, 359/289, 305–314, 316, 559, 621, 622, 623
See application file for complete search history.

(56) References Cited

U.S. PATENT DOCUMENTS 4,233,571 A * 11/1980 Wang et al. ...................... 372/99
6,577,429 B1 * 6/2003 Kurtz et al. ..................... 359/279

* cited by examiner

*Primary Examiner* — Thomas K Pham
*Assistant Examiner* — Brandi Thomas
(74) *Attorney, Agent, or Firm* — Fish & Richardson P.C.

(57) ABSTRACT

A display system includes a coherent light source that can emit a coherent light beam, a de-speckling device configured to distort a wavefront of the coherent light beam to produce a distorted coherent light beam, and a two-dimensional array of light modulators that can selectively modulate the distorted coherent light beam to select a plurality of pixels for display.

10 Claims, 6 Drawing Sheets

METHOD FOR REDUCING SPECKLE PATTERN IN DISPLAY IMAGES

CROSS-REFERENCE TO RELATED APPLICATION

This application is a divisional application of U.S. patent application Ser. No. 12/209,665, filed Sep. 12, 2008. The disclosure of the prior application is considered part of and is incorporated by reference in the disclosure of this application.

BACKGROUND

The present disclosure relates to the displaying images employing a coherent light source.

Coherent light sources such as laser devices are commonly used in display systems. When a rough surface is illuminated by a coherent laser beam, the rough surface usually exhibits a salt-and-pepper speckled appearance. The seemingly random pattern is referred to as a "speckle pattern." The speckle pattern is a random intensity pattern produced by the interference of the laser's coherent wavefronts reflected off the rough surface. When a laser is used as a light source in a display system, a speckle pattern often superimposes on the display image produced by the display system. The speckle pattern can be rather distracting to the viewer and can degrade the quality of the display image.

SUMMARY

In one general aspect, the present invention relates to a display system including a coherent light source that can emit a coherent light beam, a de-speckling device configured to distort a wavefront of the coherent light beam to produce a distorted coherent light beam, and a two-dimensional array of light modulators that can selectively modulate the distorted coherent light beam to form a display image comprising a plurality of pixels on a display surface.

In another general aspect, the present invention relates to a method for displaying an image. The method includes receiving a coherent light beam from a coherent light source, distorting a wavefront of the coherent light beam to produce a distorted coherent light beam; and selectively modulating the distorted coherent light beam by a two-dimensional array of light modulators to form a display image comprising a plurality of pixels on the screen surface.

Implementations of the system may include one or more of the following features: The de-speckling device can includes an optical medium positioned in the path of the coherent light beam between the coherent light source and the two-dimensional array of light modulators; and an actuator configured to produce an acoustic wave in the optical medium to distort the wavefront of the coherent light beam. The actuator can include a piezoelectric material mechanically coupled to the optical medium and a controller that can produce an alternating electric field in the piezoelectric material to produce the acoustic wave in the optical medium. The de-speckling device can further include one or more electrodes configured to receive electric voltage signals from the controller. The optical medium can include a dichroic mirror, a mirror, or an optical diffuser. The optical medium can be at least partially transparent to the coherent light beam. The optical medium can include glass or a transparent plastic material. The de-speckling device can include a heater configured to produce turbulent air currents in the path of the coherent light beam by heating air, wherein the turbulent air currents distort the wavefront of the coherent light beam. The heater can include a resistive element configured to be heated above ambient temperature in response to a voltage applied across the resistive element. The heater receives heat generated by the coherent light source or the two-dimensional array of light modulators. The de-speckling device can distort the wavefront of the coherent light beam by 0.1 to 100 microns while keeping the two-dimensional array of light modulators fully illuminated by the distorted coherent light beam. The de-speckling device can distort the coherent light beam at a frequency higher than 60 Hz. The de-speckling device can distort the coherent light beam at a frequency higher than 1 KHz. The two-dimensional array of light modulators each can include a micro mirror configured to selectively modulate the distorted coherent light beam to form a display pixel on the screen surface or away from the screen surface. The micro mirror can include a tiltable mirror plate having a reflective surface, wherein the tiltable mirror plate is configured to tilt to an "on" position by an electrostatic force to reflect distorted coherent light beam to form the display pixel on the screen surface.

Various implementations of the methods and devices described herein may include one or more of the following advantages. The disclosed systems and methods can improve the viewing quality of display images produced by display systems using coherent light sources. Furthermore, disclosed systems and methods are generally applicable to different types of spatial light modulators.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles, devices and methods described herein.

DETAILED DESCRIPTION

Figure 1:
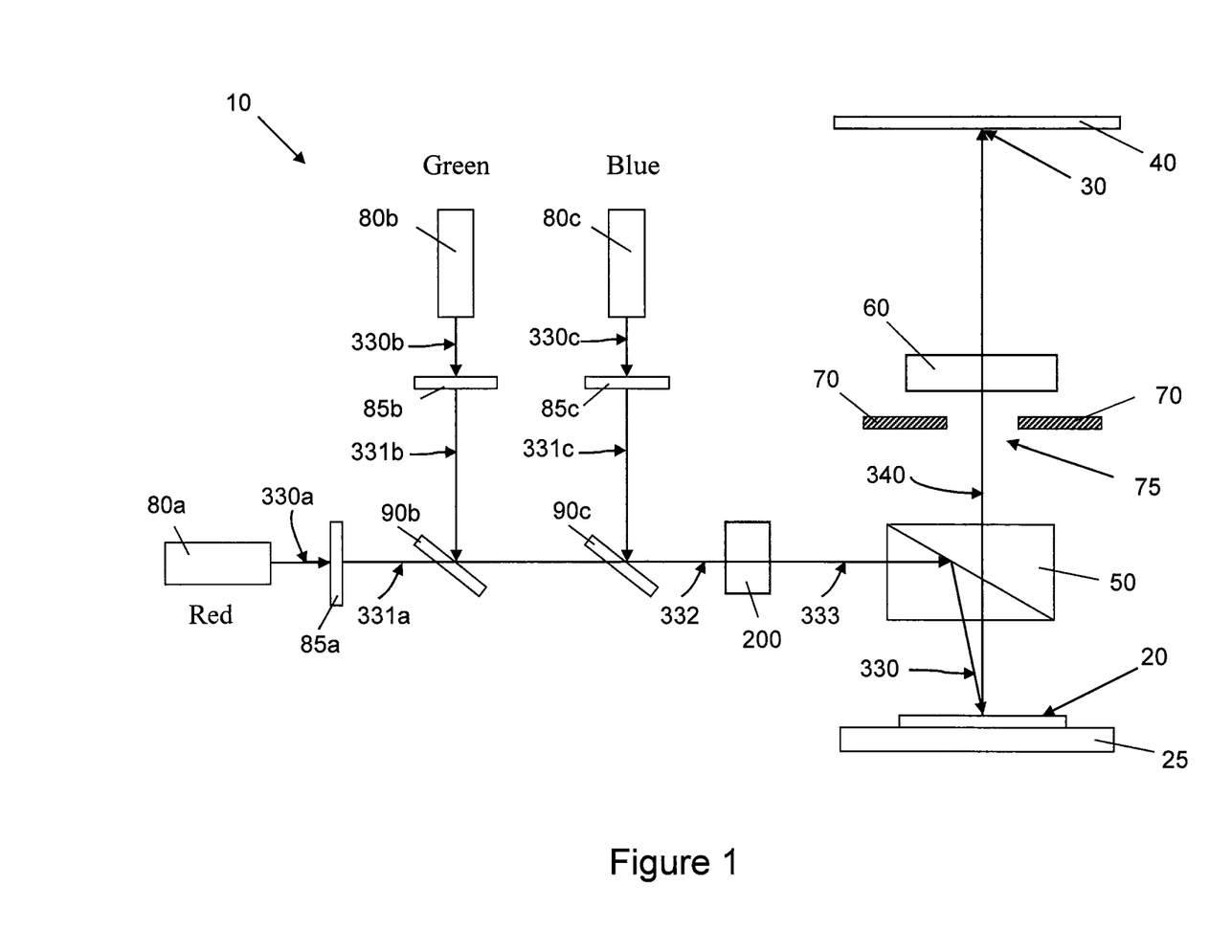
FIG. 1 is a schematic diagram of an exemplified display system including a coherent light source and a de-speckling device.

Referring to FIG. 1, a display system 10 includes a spatial light modulator 20 on a support member 25, a total internal reflection (TIR) prism 50, an opaque aperture structure 70 having an opening 75, and a projection system 60. The display system also includes one or more coherent light sources such as red, green, and blue light sources 80a, 80b and 80c, diffusers 85a, 85b, 85c, and dichroic mirrors 90b and 90c. Examples of the red, green, and blue light sources 80a, 80b and 80c include solid-state semiconductor lasers, diode pumped lasers or ion or gas laser devices. The red, green, and blue light sources 80a, 80b and 80c can sequentially emit coherent red, green, and blue light beams 330a, 330b, and 330c to illuminate the spatial light modulator 20. The sequentially emitted red, green, and blue colored light 330a, 330b, and 330c respectively pass through diffusers 85a, 85b, and 85c to form colored light 331a, 331b, and 331c. The diffusers 85a, 85b, and 85c are configured to resize (e.g., expand) and shape the cross-sections of the light beams 330a, 330b, and 330c to be compatible with the shape of the spatial light modulator 20. For example, for a rectangular shaped spatial light modulator 20, the colored light 330a, 330b, and 330c can be shaped by the diffusers 85a, 85b, 85c to have rectangular cross-sections, which can be compatible with the spatial light modulator 20.

The colored lights 331b and 331c are respectively reflected by dichroic mirrors 90b and 90c. The dichroic mirrors 90b and 90c also function as beam combiners, which merge colored lights 331a, 331b and 331c into color light 332 along a common optical path. The colored light 331a passes through the dichroic mirror 90b, and then travels along the same optical path as the colored light 331b, 331c after the colored light 331b, 331c are redirected. The color light 332 represents one of the colored lights 331a, 331b, or 331c at each time because the colored lights 330a, 330b, or 330c are sequentially emitted. The color light 332 subsequently passes a de-speckling device 200. In the present application, the term "de-speckling device" refers to a device that can alter an incident coherent light beam in such a way that the speckle pattern can be reduced or eliminated in the display image. In some embodiments, the de-speckling device 200 can slightly distort the wavefront of the colored light 332 to produce a colored light 333 that is displaced (i.e., wobulated) randomly over time in small amplitudes in two dimensions.

Figure 2:
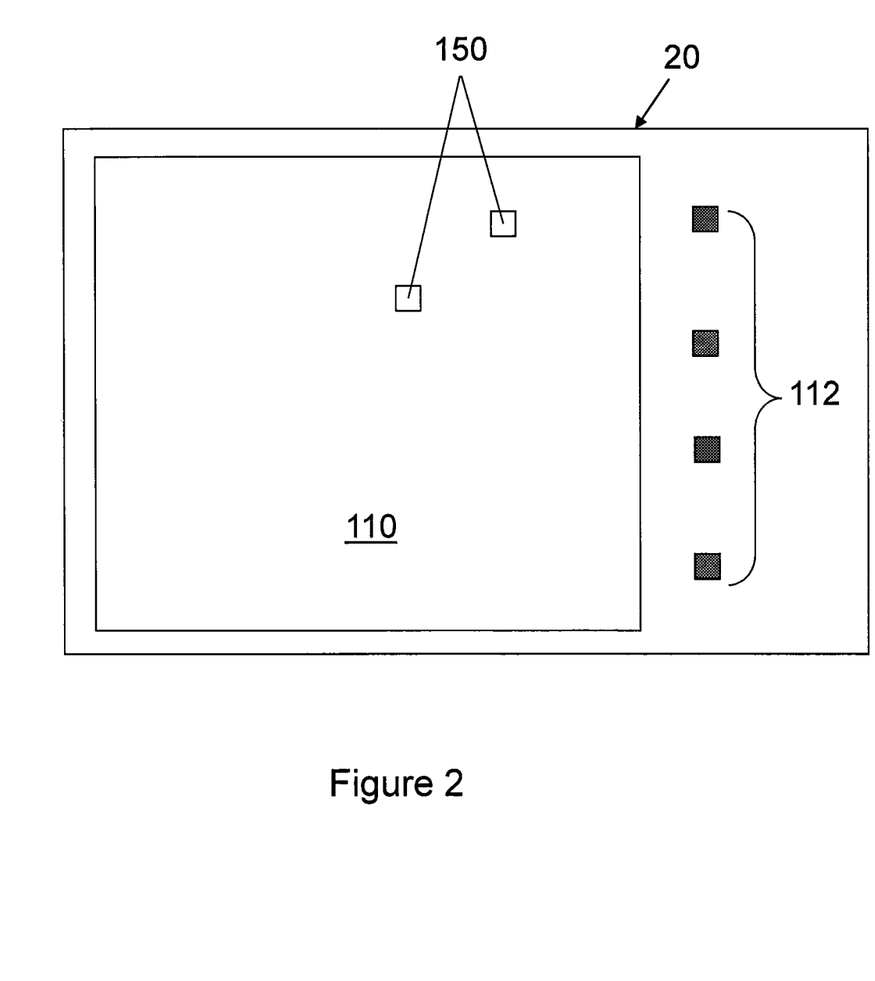
FIG. 2 is a schematic top view of a spatial light modulator compatible with the display system of FIG. 1.

The colored light 333 is reflected by the TIR prism 50 to form colored incident light 330, which illuminates micro mirrors in the spatial light modulator 20. The colored incident light 330 is selectively reflected by the spatial light modulator 20 to form a reflected light beam 340 which passes through the TIR prism 50 and the opening 75 in the aperture structure 70. When the red colored light 330a is emitted, the colored light 331a and the colored incident light 330 are red. The reflected light beam 340 is projected by the projection system 60 to form a red image on a screen surface 40. Similarly, when the green and blue colored lights 330b, 330c are respectively emitted, the colored incident light 330 is respectively green and blue. The reflected light beam 340 is projected by the projection system 60 to respectively form a green and a blue image on a screen surface 40. The red, green, and blue display images (i.e., color planes) can appear to be superimposed in the eyes of a viewer to have the visual effect of a color display image. As shown in FIG. 2, the spatial light modulator 20 includes an array 110 of light modulators 150. The color display image includes a display pixel 30 (FIG. 1) that is produced by one of the light modulators 150 in the array 110.

Figure 3:
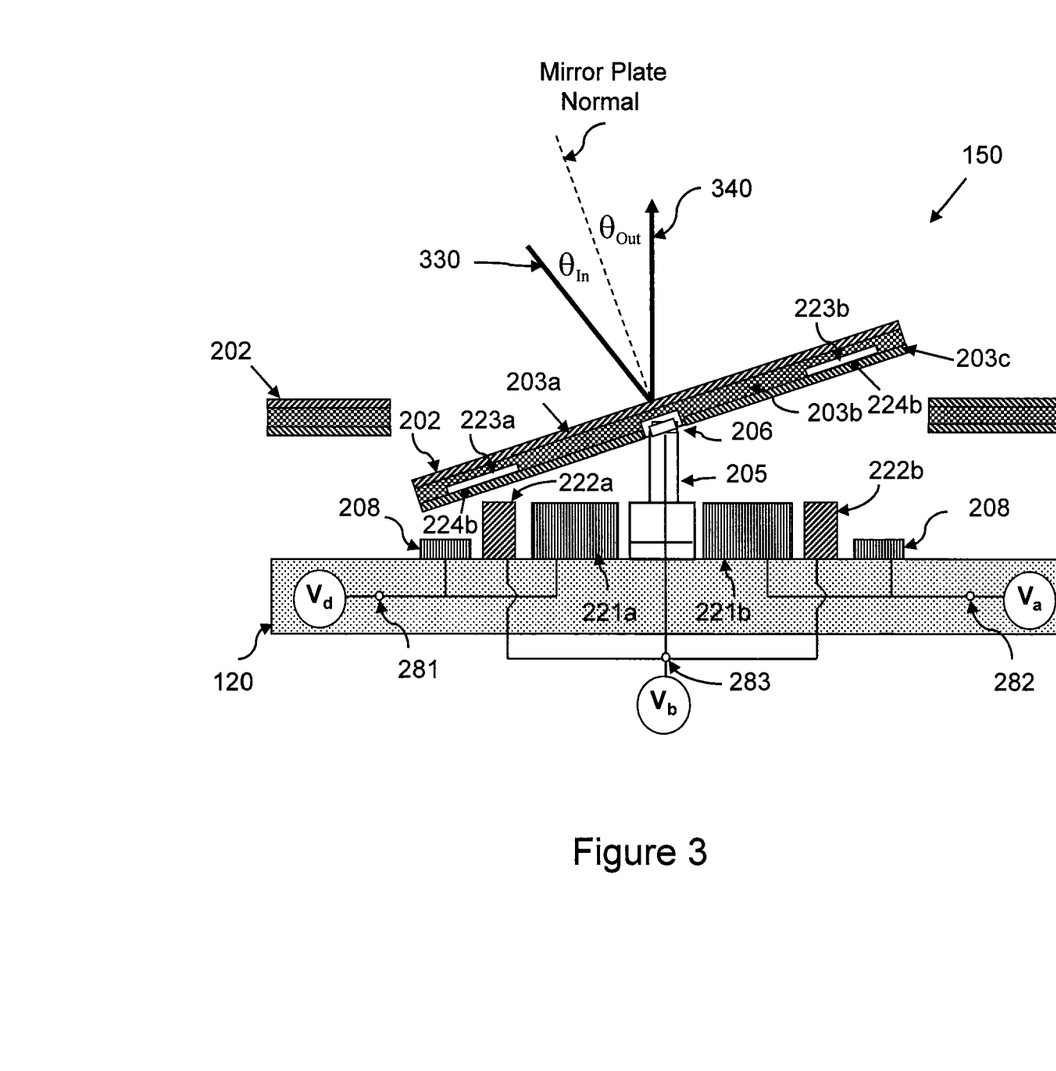
FIG. 3 is a cross-sectional view of an exemplary micro mirror in the spatial light modulator of FIG. 2.

Referring to FIG. 3, an exemplified light modulator 150 includes a mirror plate 202 that includes a flat reflective upper layer 203a, a middle layer 203b that provides mechanical strength to the mirror plate 202, and a bottom layer 203c. The upper layer 203a is formed of a reflective material such as aluminum, silver, or gold. The upper layer 203a can have a thickness in the range of between about 200 and 1000 angstroms, such as about 600 angstroms. The middle layer 203b can be formed by a rigid material such as amorphous silicon, a metal or an alloy, typically about 2000 to 5000 angstroms in thickness. The bottom layer 203c can be made of an electrically conductive material that allows the electric potential of the bottom layer 203c to be controlled to be different from the electric potentials of step or comb electrodes 221a or 221b. The bottom layer 203c can be made of titanium, a titanium alloy, or other metallic alloys or doped semiconductors. The bottom layer 203c can have a thickness in the range of about 200 to 1000 angstroms.

A hinge 206 is connected with the bottom layer 203c (the connections are out of plane of view and are thus not shown in FIG. 3). The hinge 206 is supported by a hinge post 205 that is rigidly connected to the substrate 120. The mirror plate 202 can include two hinges 206 connected to the bottom layer 203c of the mirror plate 202. The two hinges 206 define a rotational axis about which the mirror plate 202 is able to tilt. The hinges 206 extend into cavities in the lower portion of mirror plate 202. For ease of manufacturing, the hinge 206 can be fabricated as part of the bottom layer 203c.

Step electrodes 221a and 221b, landing tips 222a and 222b, and a support frame 208 are also fabricated over the substrate 120. The heights of the step electrodes 221a and 221b can be in the range from between about 0.05 microns and 3 microns. The step electrode 221a is electrically connected to an electrode 281 with a voltage $V_d$ that is externally controlled. Similarly, the step electrode 221b is electrically connected with an electrode 282 with a voltage Va that can also be externally controlled. The electric potential of the bottom layer 203c of the mirror plate 202 can be controlled by an electrode 283 at potential $V_b$. Electric pulses applied to the electrodes 281, 282, and 283 can create electric potential differences between the bottom layer 203c in the mirror plate 202 and the step electrodes 221a or 221b, which produces electrostatic forces on the mirror plate 202. An imbalance between the electrostatic forces on the two sides of the mirror plate 202 can cause the mirror plate 202 to tilt from one orientation to another. The landing springs 222a and 222b are configured to stop the mirror plate's 202 tilt movement at a precise angle. The landing springs 222a and 222b are able to store elastic strain energy when they are deformed by electrostatic forces. The elastic strain energy can be converted to kinetic energy to push away the mirror plate 202 when the electrostatic forces are removed. The push-back on the mirror plate 202 can help separate the mirror plate 202 and the landing springs 222a and 222b. In some embodiments, the middle layer 203b includes cavities 223a and 223b, which respectively forms membranes 224a and 224b above the landing springs 222a and 222b. Similar to the landing springs 222a and 222b, the membranes 224a or 224b can also store elastic energies when the mirror plate 202 is tilted to contact the landing spring 222a or 222b under electrostatic forces. The elastic energy stored in the membranes 224a or 224b can separate the mirror plate 202 from the landing tip 222a or 222b when the electrostatic forces are removed. In some embodiments, the landing springs 222a and 222b are electrically connected to the hinge post 205 and to the electrodes 283 so that there is no potential difference between the landing springs and bottom layer 203c of the mirror plate 202 when these members come into mechanical contact. Alternatively, the micro mirror can be formed without landing springs 222a and 222b. Such devices without landing springs can include a cantilever spring, bridge spring or hinge layer connected to the mirror with stitches.

The electrical pads 281, 282, 283 are electrically connected to electrical pads 112 adjacent to the array 110 of light modulator 150. In operation, the electrical pads 112 can receive control electrical signals from a control circuit. The control electrical signals can individually address light modulator 150 and produce electrostatic forces on the mirror plate 202 to tilt the mirror plate 202 to an "on" position and an "off" position. When the mirror plate 202 is at an "on" position, as shown in FIG. 3, the color incident light 330 forms an incident angle $\theta_{In}$, relative to the normal direction of the mirror plate 202. The reflected light beam 340 forms a reflective angle $\theta_{Ref}$ of equal value relative to the normal of the mirror plate 202. The directions of the color incident light 330 and the reflected light beam 340, and the orientation of the mirror plate at the "on" position can be arranged so that the reflected light beam 340 is substantially vertical to the top surface of the substrate 120. When the mirror plate 202 is tilted to reflect light in the "off" position, the light is directed away from a screen surface, such as to an absorbing surface or sufficiently far enough away from the light directed in the "on" position to cause little to no interference. Thus, at any one moment in time, neighboring pixels on the screen surface can be "on" or "off", depending on the orientation of mirror plates in the array 110.

Referring now to FIG. 1, the colored light 332 is continuous and spatially non-discrete. The coherence pattern in the colored light 332 is defined by the red, green, and blue colored light 330a, 330b, and 330c respectively emitted by the red, green, and blue light sources 80a, 80b and 80c. The reflected light beam 340 has been spatially modulated by the array 110 of the light modulators 150 (FIG. 2). In the absence of the de-speckling device 200, the colored light 332 would travel along a straight and fixed optical path to the TIR prism 50. The coherence in the reflected light beam 340 can create undesirable speckle patterns (i.e., a "salt and pepper pattern") in the display image on the screen surface 40.

Figure 4A:
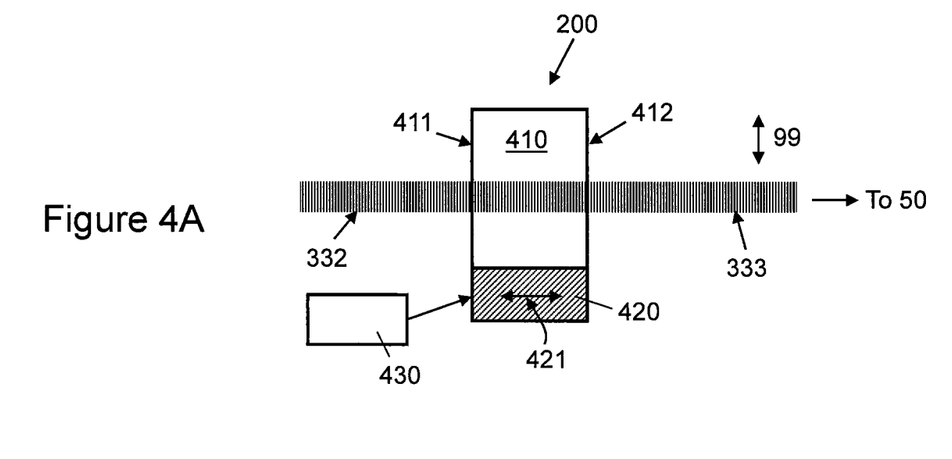
FIGS. 4A and 4B are schematic diagrams of an exemplified de-speckling device compatible with the display system of FIG. 1.
Figure 4B:
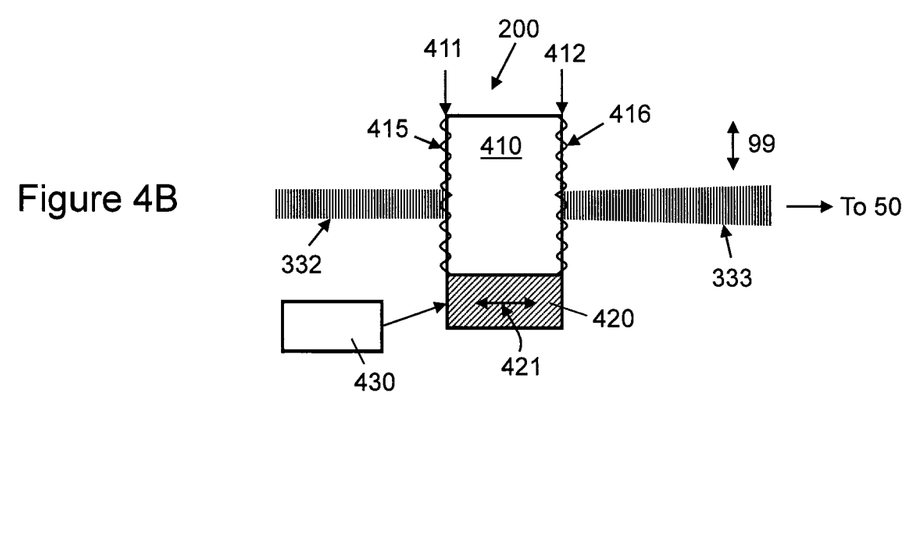

The de-speckling device 200 is introduced to dynamically disturb the coherence pattern in the colored light 332 in order to reduce the speckle pattern in the display image. Referring to FIGS. 1, 4A and 4B, the de-speckling device 200 includes a transparent media 410 having a front surface 411 and a back surface 412, an actuator 420 in contact with the transparent media 410, and a controller 430. The transparent media 410 can be formed by glass or a transparent plastic material. The actuator 420 can be a piezoelectric material in contact with a pair of electrodes (not shown). Without actuation by the actuator 420, as shown in FIG. 4A, the front surface 411 and the back surface 412 are stable and remain flat. The colored light 332 passes through and exits the transparent media 410 to form the colored light 333. The colored light 333 is moving dynamically over small distances, but has substantially the same propagation direction and beam spread of the colored light 332.

The controller 430 is configured to apply voltages at the appropriate amplitudes and frequencies to actuate the actuator 420. For example, the controller 430 can create an alternating electric field in the piezoelectric material of actuator 420 to induce vibrations in the direction 421. The frequency of the vibration is controlled to be higher than the video refresh rate of 60 Hz. For example the vibration frequency can be in a range between 1 kHz and 10 MHz. The vibration frequency can be twenty to one hundred thousand times the video refresh rate.

Referring to FIG. 4B, the vibration of the actuator 420 can create surface acoustic waves 415, 416 respectively at the front surface 411 and/or the back surface 412 of the transparent media 410. The surface waves 415, 416 can distort the wavefront of the colored light 332 at the front surface 411 and/or the back surface 412, and undulate the colored light 333 in the direction 99. The beam of the colored light 333 is also somewhat more divergent over a cycle of surface vibration due to the diffractions by the rippled surface waves 415, 416. The colored light 333 is still continuous and spatially non-discrete; only its wavefront is distorted.

Referring to FIGS. 1-4, the wavefront of the colored incident light 330 is dynamically distorted over time. The wavefront of the colored incident light 330 can be dynamically displaced by between 0.1 to 100 microns, depending on the size of the picture element in the projected image. The coherent light beam is broad enough to keep the array 110 of light modulator 150 (FIG. 2) fully illuminated during the displacements and the distortion of the wavefront. The magnitude of the displacements of the colored incident light 330 can be controlled by the voltage applied to the actuator 420 by the controller 430. The magnitude of the displacements of the colored incident light 330 on the spatial light modulator 20 can be controlled to be larger than the wavelength of the colored incident light 330. For example, the displacements can range between 0.1 and 100 microns, or between 1 and 10 microns. As the colored incident light 330 moves in a vibration cycle, different portions of the colored incident light 330 come to illuminate a particular mirror plate 202 in a light modulator 150. Since the different portions of the coherent color incident light 330 have different coherence phases, the speckle pattern produced by the reflected light beam 340 on the screen surface 40 shifts in accordance to the movements in the colored light 333. Since the movements of the colored light 333 and the colored incident light 330 have a frequency higher than the video frame rate, the shifted speckle patterns on the screen surface 40 are averaged out within the period of a video frame. The visual effects of the "salt and pepper" speckle patterns can thus be reduced or eliminated.

Figure 5A:
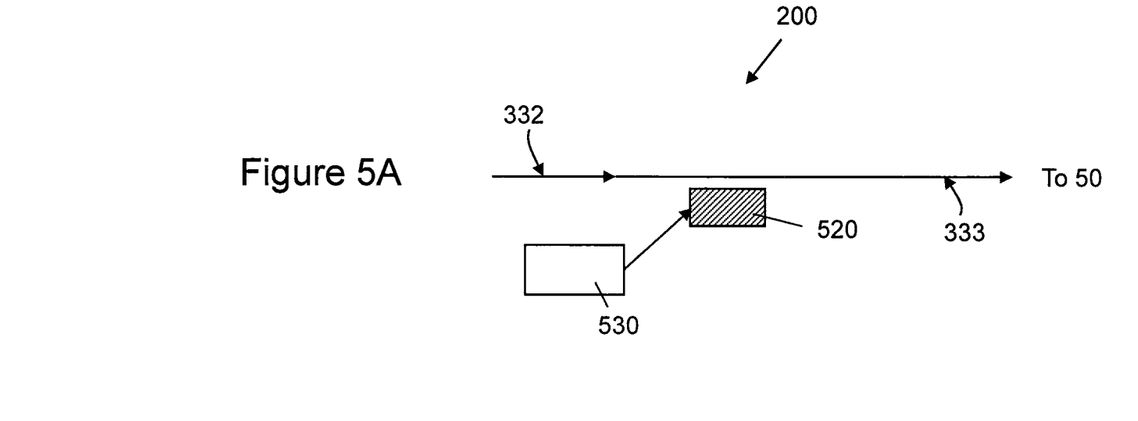
FIGS. 5A and 5B are schematic diagrams of another exemplified de-speckling device compatible with the display system of FIG. 1.
Figure 5B:
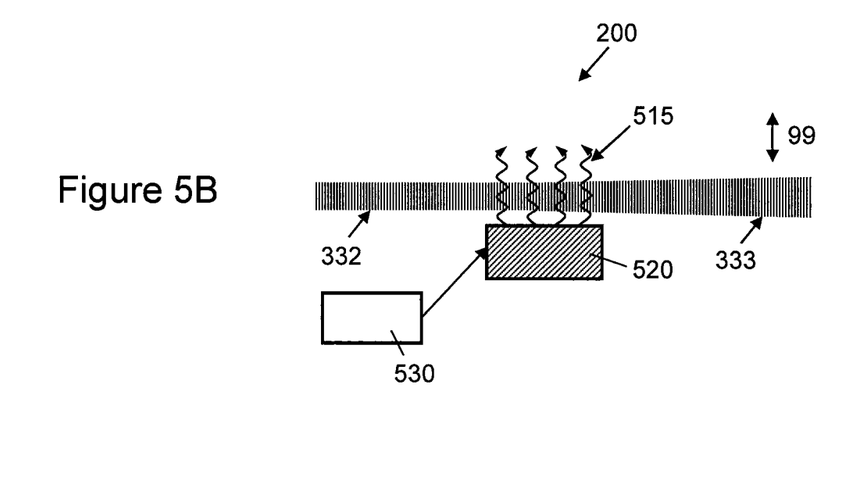

In some embodiments, referring to FIGS. 5A and 5B, the de-speckling device 200 includes a heater 520 positioned slightly below the path of the colored light 332. A controller 530 can control the temperature of the heater 520. In one implementation, the heater 520 can include a thermal resistor that can be heated by an electric current produced by a voltage applied by the controller 530. When the heater 520 is heated to a certain temperature above ambient temperature, turbulent air currents 515 can be produced in the air above the heater 520 and in the path of the colored light 332. For example, the heater temperature can be elevated to 20° C. to 80° C. higher than the ambient temperature to create turbulent air currents in the path of the colored light 332. The turbulent air currents 515 are hotter than the surrounding air and thus have a slightly lower and spatially variable refractive index. The turbulent air can distort the wavefront and scramble the coherent phases of the colored light 332. The wavefront of the colored incident light 330 (FIG. 1) is thus distorted and can move across the spatial light modulator 20 (FIG. 1). As described above, the displacements of the colored incident light 330 on the spatial light modulator 20 can be controlled to be larger than the wavelength of the colored light 333, and at a frequency higher than the refresh rate of the video frames.

In some embodiments, turbulent air currents can be generated by heat generated by one or more components in the display system. Heat is usually generated by light sources (e.g., 80a-80c in FIG. 1) such as lasers, which are conventionally cooled by forcing air over their heat sinks. Another heat source is the spatial light modulator 20 (FIG. 1). It absorbs part of incident light and has to be cooled in higher output illumination applications. Instead of being actively heated using an external power, the heater 520 (shown in FIGS. 5A and 5B) can be heated by thermal conduction from a heat-generating light source or the spatial light modulator. The colored light 332 can pass through the hot, turbulent air above the heater 520 to reduce laser speckle in the display image. In this arrangement, the heater 520 also serves as a cooling device for the light source.

Figure 6:
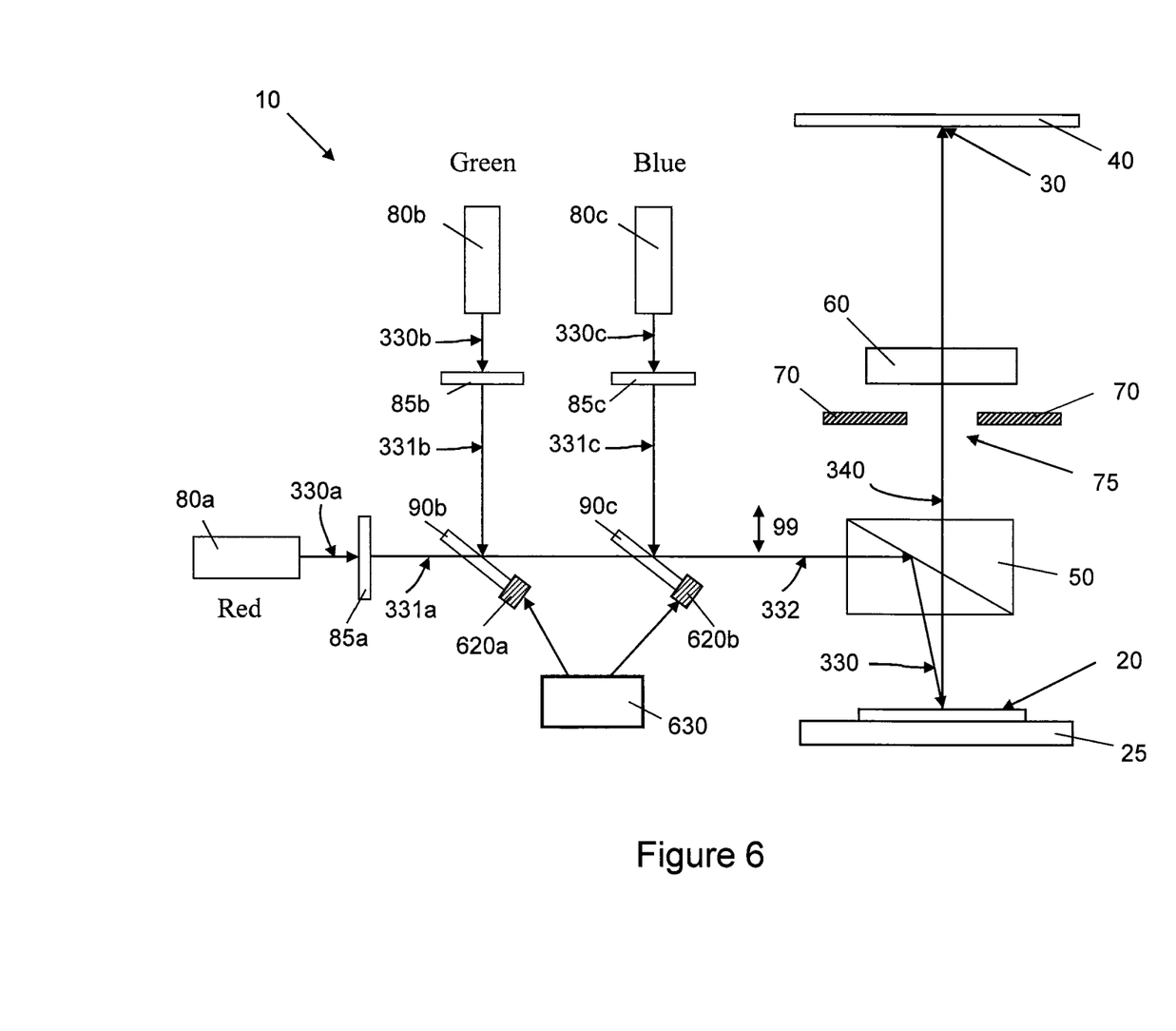
FIG. 6 is a schematic diagram of another exemplified arrangement for reducing speckle in a display system.

In some embodiments, a de-speckling device can also perform other functions in a display system. Referring to FIG. 6, where the numbers that are the same as in FIG. 1 represent the same elements, actuators 620a, 620b are respectively attached to the dichroic mirrors 90*b*, 90*c*. The actuators 620*a*, 620*b* are controlled by a controller 630. Similar to the description above of the embodiment shown in FIGS. 4A and 4B, the actuators 620*a*, 620*b* can be controlled by the controller 630 to create surface acoustic waves in the dichroic mirrors 90*b*, 90*c*, which can distort the wavefronts of the colored light 331*a*, 331*b*, and 331*c* and undulate the colored light 331*a*, 331*b*, and 331*c* in the direction 99. As a result, the speckle patterns in the display image can be reduced or eliminated. Surface acoustic waves can also be generated in other reflective or transmissive optical components such as diffusers, lenses, and mirrors to reduce speckling in the display image.

It is understood that the disclosed systems and methods are compatible with other configurations of spatial light modulators such as other reflective devices, i.e., LCoS devices, or transmissive liquid crystal devices. Moreover, the time-varying distortions of the wavefront of the coherent incident light can be achieved by different mechanisms and using different optical components. The de-speckling device can be positioned in the light path before the incident light impinges the spatial light modulator or after light has been reflected by the spatial light modulator.

What is claimed is:

1. A method for displaying an image, comprising:
    receiving a coherent light beam from a coherent light source;
    distorting a wavefront of the coherent light beam with a de-speckling device to produce a distorted coherent light beam; and
    selectively modulating the distorted coherent light beam by a two-dimensional array of light modulators to select a plurality of pixels for display
    wherein the distorting is carried out by:
    positioning an optical medium in the path of the coherent light beam between the coherent light source and the two-dimensional array of light modulators; and
    producing an acoustic wave in the optical medium that generates a translational, rotational or tilting motion of the wavefront of the coherent light beam.

2. The method of claim 1, wherein the acoustic wave is produced by an alternating electric field in a piezoelectric material and coupled into the optical medium.

3. The method of claim 1, wherein the optical medium includes a dichroic mirror, a mirror, or an optical diffuser.

4. The method of claim 1, wherein the optical medium is at least partially transparent to the coherent light beam.

5. A method for displaying an image, comprising:
    receiving a coherent light beam from a coherent light source;
    distorting a wavefront of the coherent light beam to produce a distorted coherent light beam; and
    selectively modulating the distorted coherent light beam by a two-dimensional array of light modulators to select a plurality of pixels for display, wherein the wavefront is distorted by using heat to produce turbulent air currents in the path of the coherent light.

6. The method of claim 5, wherein the heat is generated by a light source that produces the coherent light beam or by the two-dimensional array of light modulators.

7. The method of claim 1, wherein the de-speckling device is configured to distort the wavefront of the coherent light beam by 0.1 to 100 microns while keeping the two-dimensional array of light modulators fully illuminated by the distorted coherent light beam.

8. The method of claim 1, wherein the de-speckling device is configured to distort the coherent light beam at a frequency higher than 60 Hz.

9. The method of claim 1, wherein the de-speckling device is configured to distort the coherent light beam at a frequency higher than 1 KHz.

10. The method of claim 1, wherein the de-speckling device is configured to distort the coherent light beam at a frequency between about 1 KHz and about 10 MHz.

* * * * *